United States Patent [19]
Gaitan et al.

[11] Patent Number: 5,632,522
[45] Date of Patent: May 27, 1997

[54] HINGE ASSEMBLY FOR A BED COVER OF A TRUCK

[75] Inventors: Ramiro A. Gaitan, Portland; John B. Ward, Milwaukie; Daniel G. Willis, Portland, all of Oreg.

[73] Assignee: Gem Top Manufacturing, Clackamas, Oreg.

[21] Appl. No.: 662,317

[22] Filed: Jun. 11, 1996

[51] Int. Cl.[6] ............................................. B60P 7/02
[52] U.S. Cl. ........................................ 296/100; 296/164
[58] Field of Search ..................................... 296/100, 164

[56] References Cited

U.S. PATENT DOCUMENTS

| | | | |
|---|---|---|---|
| 3,762,762 | 10/1973 | Beveridge et al. | 296/100 |
| 3,785,698 | 1/1974 | Dean et al. | 296/100 |
| 4,324,429 | 4/1982 | Wilson et al. | 296/100 |
| 4,819,981 | 4/1989 | Moe et al. | 296/100 |
| 5,018,777 | 5/1991 | Swenson et al. | 296/100 |
| 5,102,185 | 4/1992 | Lake | 296/100 X |
| 5,104,175 | 4/1992 | Enninga | 296/100 |
| 5,131,712 | 7/1992 | Heintz | 296/100 |

*Primary Examiner*—Joseph D. Pape
*Attorney, Agent, or Firm*—Klarquist Sparkman Campbell Leigh & Whinston, LLP

[57] ABSTRACT

A hinge assembly for removably mounting a cover to a bed on a truck comprises a mounting assembly and a hinge element. The mounting assembly clamps to the bed and has a guide pin protruding therefrom. The hinge element attaches to the cover and has a guide slot into which the guide pin fits. The guide slot in the hinge element allows the cover to pivot between a closed position, in which the cover overlies the entire bed, and an open position, in which the cover is inclined relative to the bed. The guide slot has an opening so that the hinge element can be detached from the guide pin, thereby allowing the cover to be detached from the bed.

16 Claims, 3 Drawing Sheets

HINGE ASSEMBLY FOR A BED COVER OF A TRUCK

FIELD OF THE INVENTION

This invention relates to a hinge assembly for a bed cover on a truck.

BACKGROUND OF THE INVENTION

Pick-up trucks having a passenger cab and an open bed have become popular in the vehicle market for their sporty appearance and their usefulness in transporting cargo for both sport and work-related purposes.

Sometimes, the beds of pick-up trucks are used to haul and store goods. Because goods are transported and stored in all weather conditions, pick-up trucks frequently have tops for the beds to protect the goods in the bed from the environment. Two types of tops are available for the beds: caps and tonneau covers. A cap is usually shaped similarly to the cab of the truck and provides a large enclosed area in the bed of the truck.

In contrast, a tonneau cover is generally a flat sheet that mounts flat against the top of the bed to give the pickup truck a sleeker appearance than a cap. A tonneau cover is also more aerodynamic than a cap, and because a tonneau cover generally has no windows or openings, it shields any goods within the bed from visibility so as not to encourage theft. Presumably for these reasons, tonneau covers are becoming increasingly popular.

Most tonneau covers pivot along the front of the bed between a closed position covering the bed and an open position, in which the rear of the tonneau cover is tilted upwards to allow access to the inside of the bed. It is desirable that tonneau covers be easily removable from the truck bed so that people, animals, and goods larger than the area enclosed by the tonneau cover can also be easily transported. It is also desirable that tonneau covers be easy to install because pick-up truck owners often purchase the cover after purchasing the truck and desire to install the cover themselves.

SUMMARY OF THE INVENTION

It is an object of the present invention to provide the bed of a pick-up truck with a tonneau-type cover that may be easily installed.

Another object is to provide an improved hinge assembly for the tonneau-type cover so that the cover can pivot relative to the bed of the pick-up truck.

A further object is to provide a hinge assembly that may be easily attached to and detached from the bed of a pickup truck.

Still another object is to provide a hinge assembly for a cover that is adaptable for use with covers of different sizes and for mounting upon truck beds of varying sizes.

The foregoing and other advantages of the invention will become apparent from the following detailed description of the illustrated embodiment that proceeds with reference to the accompanying drawings.

In the illustrated embodiment of the invention, the hinge assembly includes a mounting assembly attachable to a top flange on the truck bed and a hinge element attachable to the bed cover. The mounting assembly has a guide pin protruding therefrom, which is adapted to engage in a guide slot formed in the hinge element and configured to allow the hinge element to slide relative to the guide pin as the bed cover is pivoted from a closed position, in which the cover overlies the bed, to an open position, in which the cover is inclined with respect to the bed.

The hinge element and the bed cover can be removed from the guide pin by pivoting the bed cover and hinge element so that the guide pin is adjacent an opening to the guide slot and then moving the cover and thus disengaging the hinge element by means of the opening from the guide pin.

DETAILED DESCRIPTION OF THE INVENTION

Figure 1:
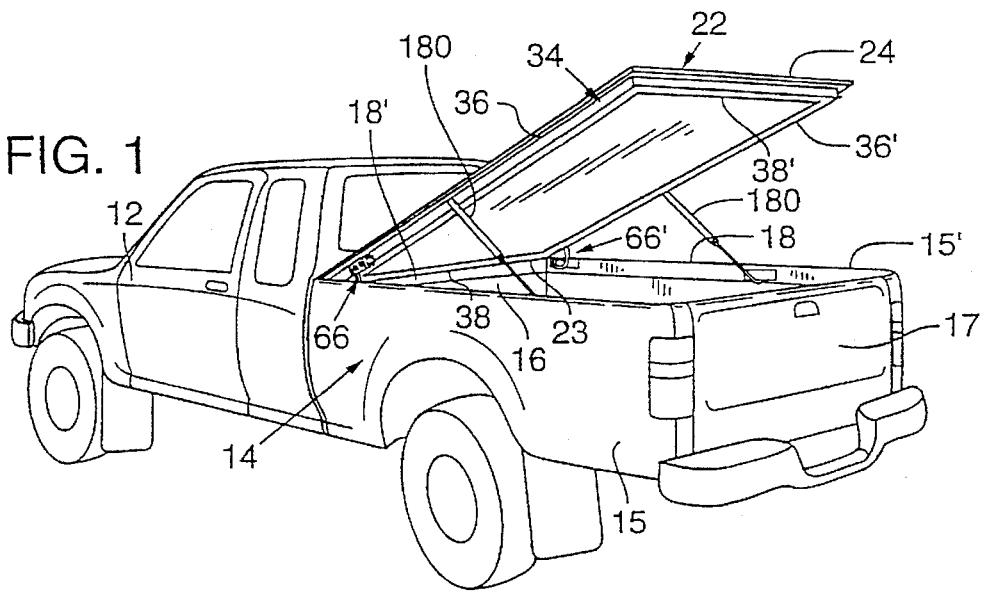
FIG. 1 is a perspective view of a truck having a hinge assembly constructed in accordance with the present invention and with a tonneau cover in the open position.

FIG. 1 illustrates a cover and hinge assembly 10 constructed in accordance with a preferred embodiment of the present invention mounted on a pick-up truck 12 having a bed 14 including upstanding opposite side walls 15, 15', a front wall 16 and a tailgate 17.

Figure 3:
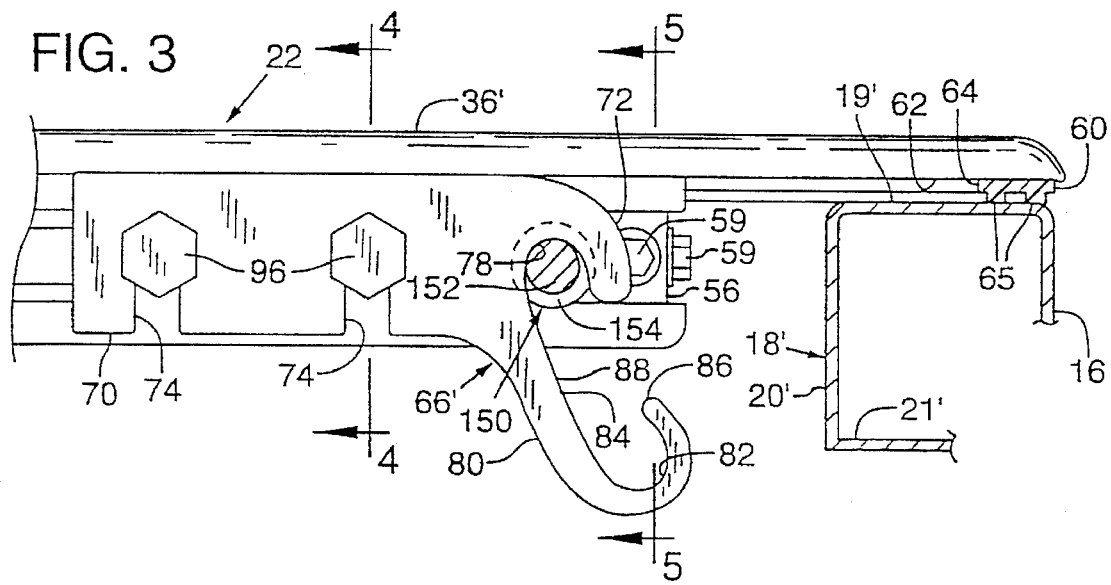
FIG. 3 is a side elevation partly in section, as viewed along line 3—3 of FIG. 5, showing part of the hinge assembly, with the cover in a closed position.
Figure 5:
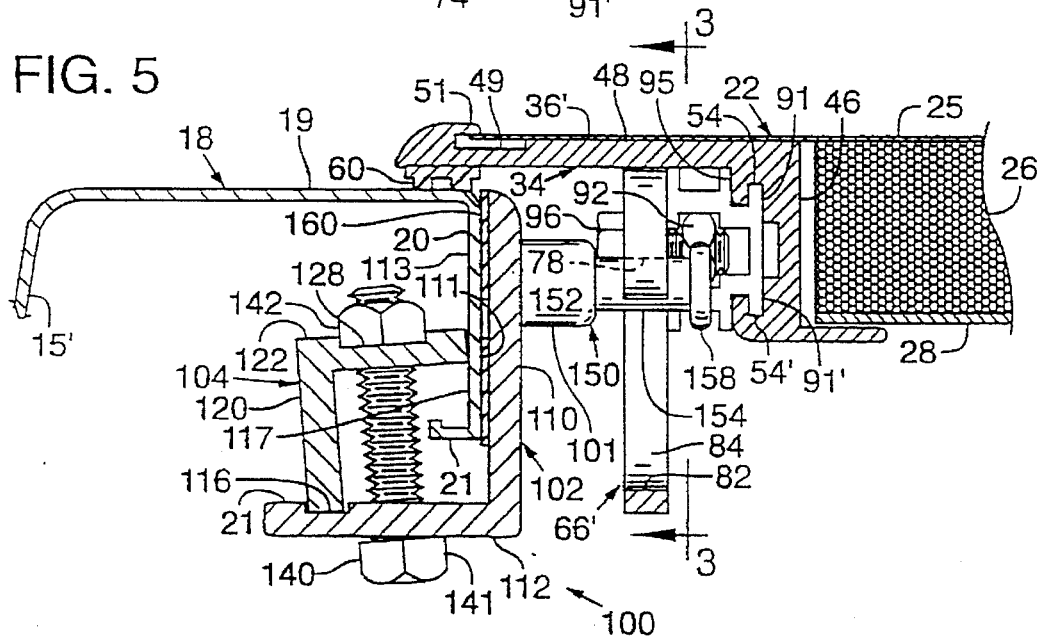
FIG. 5 is a fragmentary sectional view taken along line 5—5 of FIG. 3 including a portion of a bed flange, a portion of the mounting assembly, being removed for clarity.

As is customary, the side walls 15, 15' are each formed with an inwardly protruding flange structure 18 along the upper edges of the wall. In the illustrated truck embodiment, the flanges 18 each comprise a horizontal top wall 19 extending inwardly from side wall 15 or 15', a vertical end wall 20 extending downwardly along the inner edge of the top wall 19, and a bottom flange 21 extending back toward the side wall 15 or 15' along the lower edge of the end wall 20, as illustrated in FIG. 5. The front wall 16 of the bed 14 has a similar flange 18' found thereon including an inwardly protruding top wall 19', a vertical end wall 20', and a bottom flange 21' extending towards the front wall 16, as illustrated in FIG. 3. The illustrated flange structure is typical but it should be understood that flange structures on various pickup trucks may vary, and details of the mounting clamps to be hereafter described may have to be varied to accommodate the bed cover of the invention to the particular pickup bed.

The cover and hinge assembly 10 includes a bed, or tonneau, cover 22 hingedly coupled near its forward end 23 to the side bed flanges 18. The bed cover 22 is pivotable between a closed position, in which the cover 22 rests on top of the bed flanges 18, 18' (see FIG. 3) and overlies the entire bed 14 with the rearward end 24 overlying the tailgate 17 and the forward end 23 overlying the top wall 19' of the front bed wall 16 and extending a short distance, e.g., approximately ⅛ inch, past the front wall 16, and an open position, in which the cover 22 is inclined upwardly from the front wall 16, as shown in FIG. 1.

Figure 4:
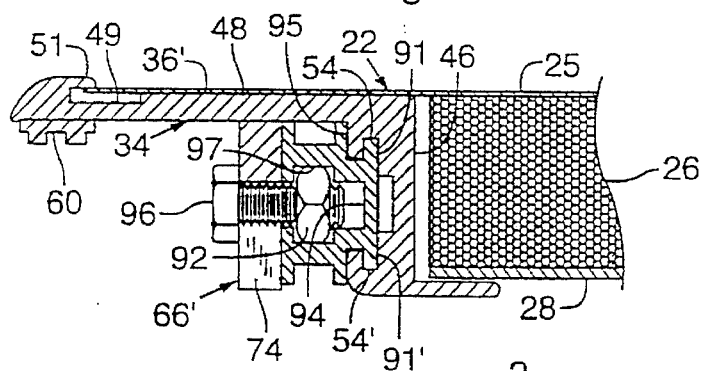
FIG. 4 is a sectional view of the hinge assembly, taken along line 4—4 of FIG. 3.

The cover 22 has a sandwich construction and comprises a thin, flat top sheet 25, preferably made from steel, with an insulation material such as a foam core 26 attached underneath the top sheet 25, and a protective sheet 28 of fiberglass or the like attached to the bottom of the foam core 26, as illustrated in FIGS. 4 and 5. The top sheet 25, the foam core 26, and the fiberglass 28 are secured together preferably with an adhesive and may be laminated together in a vacuum bag.

To provide extra rigidity to the sandwich construction, secured along the edges of the top sheet 25 by adhesive, welding, or other suitable manner, is a frame 34 comprising two opposite longitudinal frame pieces 36, 36' and two opposite transverse pieces 38, 38'.

As illustrated in FIG. 4, each frame piece 36, 36' and 38, 38' is an extruded, substantially "L"-shaped member having a short vertical leg 46 and a long horizontal leg 48. The short leg 46 extends downwardly from the top sheet 25 along the foam core 26 but preferably does not abut the foam core. The interior side 52 of the short leg 46 facing the bed flange has opposing slots 54, 54' defined therein.

The long leg 48 is positioned beneath and supports the top sheet 25. The edge of the upper surface of the long leg 48 is thickened and has a lip 51 (see FIGS. 4 and 5) extending partially over a longitudinal groove 49, which is extruded in the upper surface of the long leg 48 to assist in extruding the lip 51. The top sheet 25 fits underneath the lip 51 and preferably is secured thereto with an adhesive.

Figure 2:
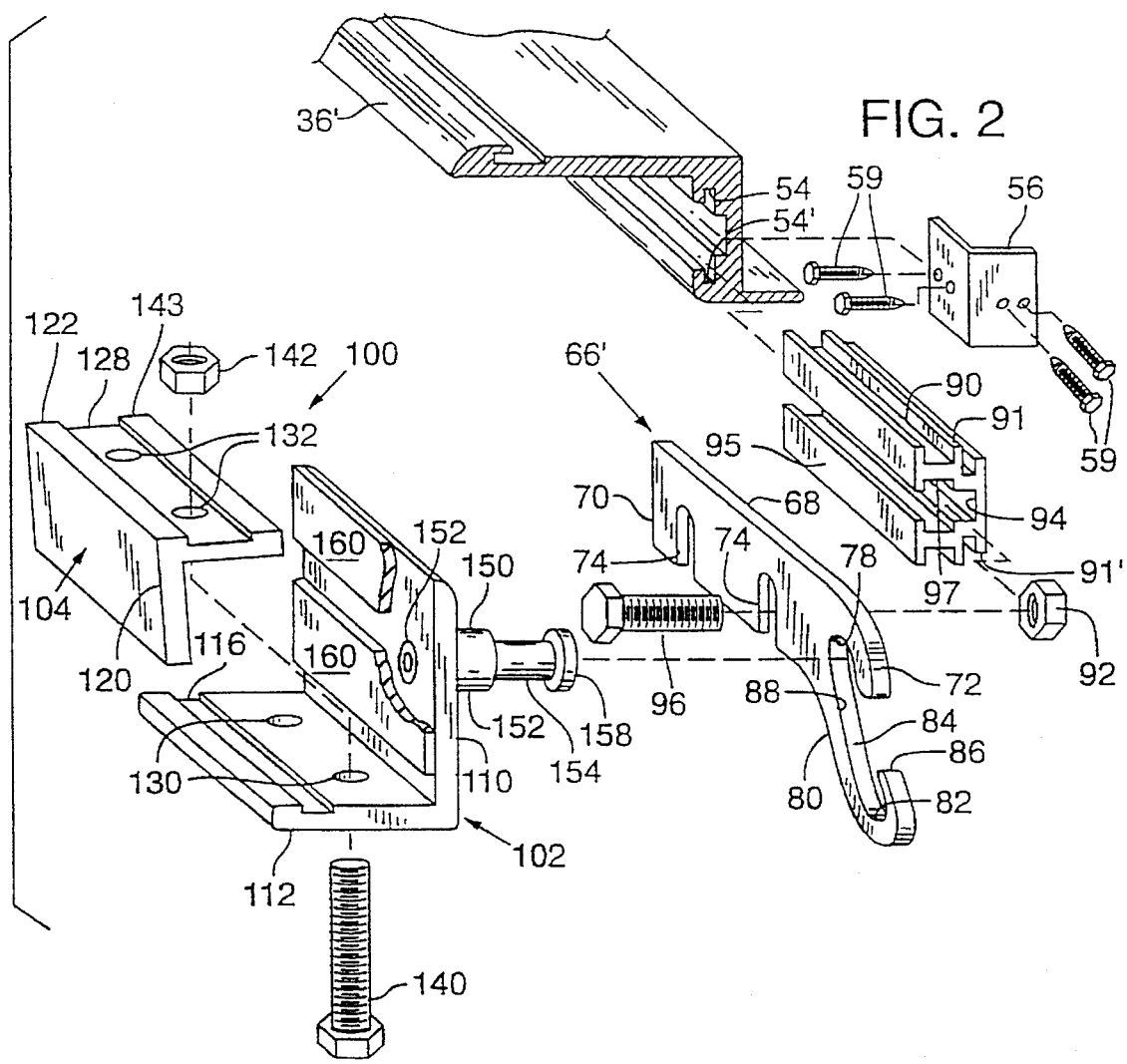
FIG. 2 is an exploded perspective view of the hinge assembly.

The ends of each of the frame pieces 36, 36',38, 38' are cut diagonally so that the frame pieces can be united by right angle corner brackets 56, one of which is shown in FIG. 2. The corner brackets 56 fit within the slots 54, 54' in adjacent frame pieces (such as the longitudinal piece 36 and the transverse piece 38) to hold the frame pieces together around the top sheet 25, the foam core 26 and the fiberglass 28. Each corner bracket 56 is secured to the respective frame pieces with self-tapping screws 59, as indicated in FIG. 2.

In the preferred embodiment, a rubber gasket 60 is attached to the undersurface 62 along the outer edge of the long leg 48 of each frame piece to provide a weatherproof seal between the closed cover 22 and the bed flange 18, 18' as illustrated in FIG. 5. The illustrated gasket 60 has a flat base portion 64 and a pair of longitudinally extending ribs 65 protruding downward therefrom to facilitate making a weather tight seal when the cover is closed, although other shapes of gaskets may be equally suitable. Also, for weatherproofing, a sealant may be applied at all connections between pieces, such as where the top sheet 25 fits under the lip 51 on the frame 34.

The rearward end 24 of the cover 22 has a pawl latch (not shown) or a similar fastening mechanism attached thereto for fastening onto a catch (not shown) on the interior of the tailgate 17.

It should be understood that the cover 22 could be constructed in a variety of other ways and that with slight modifications, the hinge assembly to be described can be used with any cover construction.

Figure 7:
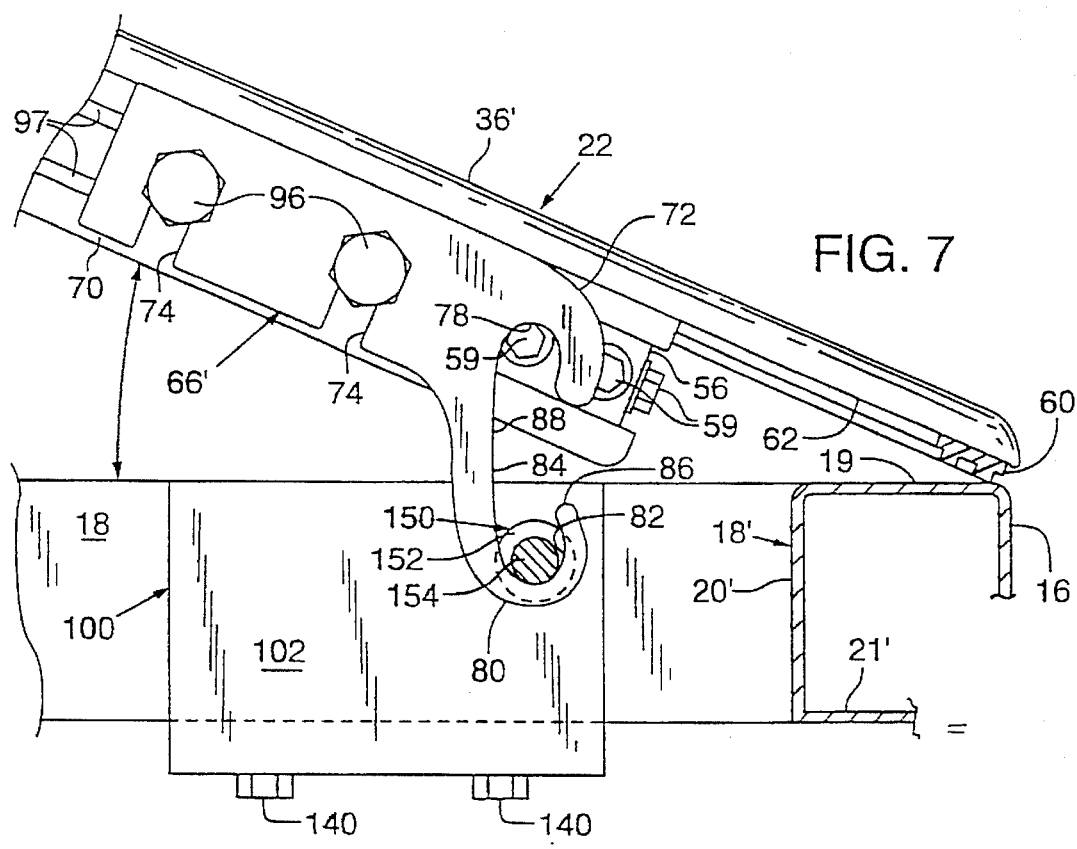
FIG. 7 is a side elevation of the hinge assembly shown in FIG. 3, but with the cover in an open position.

As shown in FIG. 1, the cover 22 is hinged to the bed 14 by hinge assemblies 66, 66', which allow the cover 22 to pivot about the forward end 23 of the cover 22 and to be easily removed from the bed 14. FIG. 3 illustrates the cover in a closed position, and FIG. 7 illustrates the cover in an open position. The hinge assemblies 66, 66' are mirror images of one another, and therefore only the hinge assembly 66' on the right side of the bed 14 is described herein.

The hinge assembly 66' includes a hinge element 68 comprising a substantially rectangular, plate-like, mounting portion 70 and a hook defining portion 72, as illustrated in FIG. 3. The mounting portion 70 has two U-shaped slots 74 for mounting the hinge element 68 to the longitudinal frame 36' of the cover 22, as more particularly described below.

In the preferred embodiment, the hook defining portion 72 is unitary with the mounting portion 70 and extends forwardly therefrom with respect to the bed 14. The hook defining portion 72 is substantially "c"-shaped and is inclined downwardly and forwardly from the mounting portion 70 when the hinge element 68 is in a closed position. The hook portion 72 has an upper bight 78, a leg 80 extending downwardly from the upper bight 78, and a lower bight 82 at the opposite end of the leg 80. The "c" shape of the hook portion 72 defines a guide slot 84 with a forwardly facing opening 86 to the exterior of the hook portion 72. The surface 88 of the hook opposite the opening is preferably arcuate as will be explained in greater detail hereinafter.

Referring to FIGS. 4 and 5, the hinge element 68 is secured to the vertical leg 46 of the frame piece 36' by a bracket 90 formed with oppositely directed fins 91, 91' that engage within the slots 54, 54' respectively. The bracket 90 is mounted on the leg 46 by sliding the same thereon from the forward end of the frame piece before assembly of the frame pieces 36', 38'. It is secured in place between the adjacent corner bracket 56 and a deformation of the side wall of the track 54. Alternatively, the bracket 90 could be secured between the adjacent corner bracket 56 and another securing means, such as a flat, plate-like bracket (not shown), which fits in the slots 54, 54'. The plate-like bracket could be held in place by screws (not shown).

The bracket 90 is provided with a slot 94 extending inwardly from its exposed face 95, which is intersected with a vertical slot 97, as best seen in FIG. 2. The vertical slot 97 is sized to slidably receive a pair of nuts 92 and to restrain them from rotation, the nuts being threaded onto bolts 96 that in turn are received in the slots 74 of the hinge element 68. Tightening of the bolts 96 secures the hinge element to the bracket and thus to the cover 22. A star washer (not shown) or another type of lock washer may be fitted under the head of the bolts 96 to help keep them in place.

FIG. 5 illustrates a mounting assembly 100 for supporting a hinge post 101 upon the truck bed flange 18. The mounting assembly 100 of the illustrated embodiment includes a large angle bar 102 and a small angle bar 104, both of which are preferably extruded of aluminum. The large angle bar 102 has a vertical leg 110 adapted to engage against the outer vertical surface 111 of the end wall 20 of the bed flange 18, and a horizontal leg 112 that extends inwardly beneath the flange 21 in spaced relation thereto. The small angle bar 104 engages between the inner vertical surface 113 of the bed flange end wall 20 and the leg 112 of the large angle bar 102 to clamp the assembly 100 to the bed flange 18.

As may be seen in FIG. 5, the upper surface of the leg 112 is formed with a groove 116 therein. The small angle bar 104 in its operative position has a first substantially vertical leg 120, the lower end of which engages in the groove 116, and a second leg 122 extending perpendicularly from the leg 120, the leg 122 being of slightly greater length than the distance between the groove 116 and the plane of the inner surface 117 of the bed flange, the leg 120 being about one half the length of the vertical leg 110 of the large angle bar 102. Because of the length of the short leg 122 it engages the surface 117 at a slightly inclined position, as shown in FIG. 5, which helps effect clamping of the assembly to the bed flange 18. Such clamping is attained by means of a pair of bolts 140, the shanks of which extend upwardly from beneath the leg 112 of the angle bar 102, through a pair of slots 130 (see FIG. 2) in the leg 112, and through a pair of cooperative holes 132 in the leg 122 of the angle bar 104, the heads 141 of the bolts engaging the underside of the leg 112. The upper surface 143 of the leg 122 is formed with a longitudinal groove 128 sized to received a pair of hex-nuts 142 with the flats of the nuts engaging the sides of the groove 128. The nuts 142 receive the upper ends of the bolts 140, which can be rotated by a suitable tool to thread the bolts into the nuts 142 to draw the leg 120 into snug engagement with the truck bed flange 18 by reason of the angular disposition of the angle bar 102. Washers (not shown) could be used underneath the heads 141 of the bolts 140.

An end of a guide pin 150 is fixedly mounted, preferably by riveting, in a hole 152 in the vertical leg 110, as best seen in FIG. 2. The guide pin extends perpendicularly from the leg 110 and is adapted to fit within the guide slot 84 in the hook 76. The guide pin 150 has an enlarged diameter base portion 152 adjacent the leg 112, an axially-aligned reduced diameter pivot portion 154 extending from the enlarged diameter portion 152, and an enlarged head 158 on its outer end. As best seen in FIG. 5, when the cover 22 is mounted on the bed 14 the hook portion 72 of the hinge element 68 is engaged on the pivot portion 154 of the guide pin 150, the pin head 158 and base portion 152, each being of larger diameter than the openings in the rights 78, 82, the diameter of the pivot portion 154 being less than the width of the opening 76 of the hook portion 72. To assemble the mounting assembly 100 to the bed flange 18, the small angle bar 104 is loosely connected by the bolts 140 to the large angle bar 102 and cocked temporarily to slide it over the flange 21 on the bed flange 18. The bolts 140 are then tightened down to clamp the bed flange 18 between the large and small angle bars 102 and 104, as shown in FIG. 5. The groove 116 functions as a fulcrum about which the small angle bar rotates into engagement with the wall 20 of the bed flange. Thus, the mounting assembly 100 provides an easy way to attach the guide pin 150 to the bed flange 18.

The interior surface of the vertical leg 110 may be provided with pads 160 made of a protective material, such as a double-sided rubber tape to protect the exterior surface 111 of the bed flange 18.

In operation, the hinge assembly 66 allows the cover 22 to pivot about its forward end 23 on the top wall 19' of the front bed flange 18! of the truck 12 and, alternatively, to be removed from the bed 14. In the closed position, the cover 22 lies flat over the entire bed 14 of the truck 12 with the upper right 78 of the hook portion 72 of the hinge element 68 engaging the guide pin 150, as shown in FIG. 3.

The cover 22 can be moved from the closed position into the open position by lifting the rearward end 24 of the cover 22 upward, as shown in FIG. 1. The lifting causes the cover 22 to pivot on the top wall 19' of the flange 18' on the front end of the bed 14 about an axis extending along the forward end of the gasket 60. The gasket 60 prevents metal-to-metal contact between the cover 22 and the top wall 19' during pivoting. When the lower right 82 of the hook reaches the guide pin 150, the cover 22 has reached its open position, as shown in FIG. 7.

As the cover 22 moves from the closed to the open position, the guide slot 84 allows the hinge element 68 to slide in an arcuate path relative to the guide pin 150. As indicated previously, the surface 88 of the slot is preferably arcuate of a radius determined by simple geometry given the distance between the guide pin 150 and the pivot axis. As will be apparent, the engagement of the slot surfaces 88 upon the opposite guide pins 150 restrains the cover 22 from sliding forward on the bed 14 as it is raised.

A lubricant could be applied to the hook 76 and the guide pin 150 to ensure smooth pivoting.

As shown in FIG. 1, gas struts 180 may be connected between the bed flange 18 and the frame 34 of the cover 22 to support the cover 22 in the open position and to urge the cover 22 forwardly as it is opened or closed to maintain the surface 88 of hook in engagement with the guide pin 150. Any struts with sufficient force for the weight of the cover 22 may be used. In the exemplary embodiment, satisfactory results were achieved with struts from Suspa, Inc., of 3970 Roger B. Chaffee Boulevard, Grand Rapids, Mich.

Preferably, the gas struts 180 are mounted to the frame 34 by clipping the end of the pistons thereof onto pins (not shown) extending from the frame 34, the clips being of any conventional type to allow easy detachment of the cover.

Figure 6:
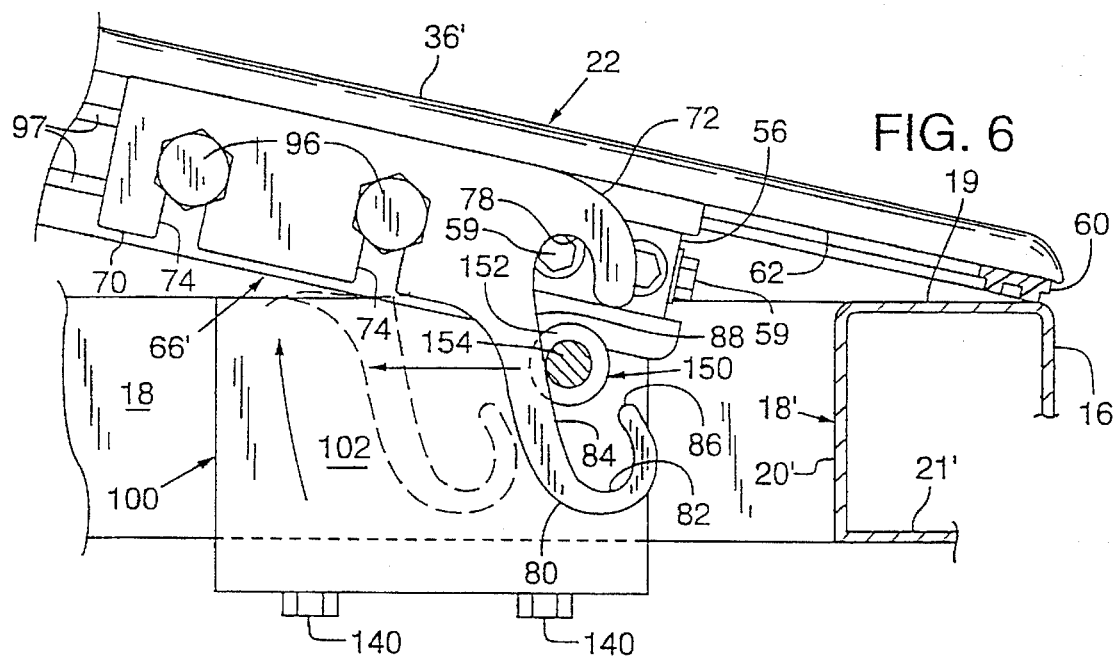
FIG. 6 is a side elevation of the hinge assembly shown in FIG. 3, but with the cover in a removal position.

To remove the cover 22 from the bed 14, the cover is pivoted into a removal position, which is between its fully opened and fully closed positions, and in which removal position the guide pin 150 is adjacent the opening 86 in the hook portion 72, as shown in FIG. 6. The cover 22 is moved then slightly rearward (to the left in FIG. 6) so that the guide pin 150 passes through the opening 86, and the hook 72 is disengaged from the guide pin 150. The gas struts 180 can then be disengaged from the frame 74 and the cover 22 removed from the bed 14. With the hook 76 disengaged, there is no connection between the cover 22 and the bed 14, and the cover 22 can be easily removed. It follows from the foregoing that the cover 22 can be mounted to the bed 14 by reversing the above steps.

This description illustrates only one embodiment of the present invention and should not be construed to limit the scope of the invention. Other modifications and variations may be made to the assembly described without departing from the invention as defined by the appended claims and their equivalents. For instance, other mounting assemblies could be used to attach the guide pin to the bed flange. We claim all such modifications and variations that come within the purview of the appended claims.

We claim:

1. A hinge assembly for removably mounting a bed cover to a side flange on a truck bed having front, side, and back walls and flanges on the tops of said side and front walls, said cover in a closed position extending over said side and front walls, said hinge assembly comprising:

a mounting assembly attachable to said bed flange;

a guide pin attached to said mounting assembly extending, when said mounting assembly is attached to said flange, into said bed; and a hinge element attachable to said bed cover and configured to receive said guide pin therein and to allow said bed cover to move between said closed position and at least one open position, in which said bed cover slopes upwardly from said front wall, said hinge element having a guide pin receiving slot therein adapted to engage said pin and restrain movement of said cover either forwardly or rearwardly of said bed in the fully open or fully closed position of said cover, said hinge element defining an opening to said slot on the side thereof facing said front wall to allow removal of said hinge element from around said guide pin by moving said cover into a removal position intermediate said fully open and fully closed positions, in which said guide pin is adjacent said opening, whereby by moving said cover and attached hinge element rearwardly said guide pin passes through said opening in said hinge element, thereby separating said hinge element from said guide pin and thus said bed cover from said bed flange.

2. The hinge assembly of claim 1 in which said bed cover has an end and said bed cover is pivotable about an axis near said end of said bed cover between said open and closed positions.

3. The hinge assembly of claim 1 in which said hinge element further includes a slot that is arcuate so as to define a pivotal path through which said hinge element pivots between said open and closed positions.

4. The hinge assembly of claim 3 in which said guide pin has an enlarged diameter portion, a reduced diameter portion having a distal end, and a head attached to said end of said reduced diameter portion, and in which said reduced diameter portion is sized to fit within said slot.

5. The hinge assembly of claim 1 in which said hinge element includes an upper bight, a lower bight, and a leg connecting said upper and lower bights, and in which said upper bight, said lower bight, and said leg define a slot that allows said hinge element to pivot relative to said guide pin, said opening being opposite said leg and extending into said slot.

6. The hinge assembly of claim 5 in which said hinge element is an inclined "c"-shaped hook.

7. The hinge assembly of claim 5 in which said leg of said hinge element slides along said guide pin when said bed cover is moving between said open and closed positions.

8. The hinge assembly of claim 1 in which said mounting assembly comprises a clamp means for clamping said mounting assembly to said bed flange.

9. The hinge assembly of claim 8 in which said clamp means comprises:
   a large angle bar having a pair of perpendicular legs of predetermined length;
   a small angle bar having a pair of perpendicular legs of lesser length than said large angle bar legs, said bars being arranged with the interior angles thereof in opposed relation; and
   a fastener means operationally engaging said large and small angle bars for clamping said large and small angle bars together such that a hollow area is formed between said large and small angle bars and at least one of said small and large angle bars can be moved to accommodate said bed flange between said small and large angle bars, said fasteners tightening around said bed flange to securely situate said clamp on said bed flange.

10. The hinge assembly of claim 9 in which said bed flange has a first side and a second side and in which said large angle bar of said clamp has two legs, each with an exterior and an interior surface, and said clamp is clampable around said bed flange such that said interior surface of one of said legs of said large flange abuts said first side of said bed flange and said small angle clamps against said second side of said bed flange so that said large angle is securely positioned against said bed flange, and
   in which said guide pin is mounted to said exterior of one of said legs of said large flange and extends outwardly therefrom.

11. The hinge assembly of claim 1 in which said hinge element is located near said forward end of said bed cover and in which said bed cover also has an actuator mounted at a position away from said hinge element to press said hinge element against said guide pin so that said hinge element maintains contact with said guide pin when moving between said open and closed positions.

12. In a truck having a bed with a bed flange and a bed cover with an end, a hinge assembly for removably mounting said bed cover to said bed flange and allowing said bed cover to pivot, said hinge assembly comprising:
   a guide pin attachable to one of said bed flange and said bed cover; and
   a hinge element attachable to the other of said bed flange and said bed cover, said hinge element having an exterior, a guide slot, and an opening between said guide slot and said exterior of said hinge element, said guide slot being configured to receive said guide pin therein; and
   in which said guide pin is pivotable relative to said hinge element about an axis remote from said guide pin between a closed position and an open position and in which said guide slot is shaped to allow said pivotal movement of said pin from said closed position to said open position; and
   in which said pin is removable from said hinge element by moving said pin through said opening in said hinge element so that said pin separates from said hinge element, whereby said cover detaches from said bed.

13. The hinge assembly of claim 12 in which said bed and said bed cover have a strut mounted therebetween that presses said hinge element against said guide pin to help support said cover when moving between said open and closed positions.

14. The hinge assembly of claim 12 further comprising a mounting assembly attachable to said bed flange and in which one of said guide pin and said hinge element is mounted on the mounting assembly.

15. In a truck having a bed with a bed flange extending around at least a portion of said periphery of said bed and a bed cover with an end, a hinge assembly for mounting said bed cover to said bed flange, allowing said bed cover to pivot about said end of said bed cover, and allowing removal of said bed cover from said bed flange, said hinge assembly comprising:
   a clamp mounting assembly including two angle pieces clamped together by a fastener to form a hollow area, said clamp mounting assembly being clampable on said bed flange;
   a guide pin attached to said clamp mounting assembly; and
   a hinge element attachable to said bed cover, the hinge element having a hook that defines a guide slot, said hook having an upper bight, a lower bight, a leg connecting said upper and lower bights on a side of said hook, and an opening on the other side of said hook, said guide slot fitting around said guide pin; and
   in which said hook and thereby said cover are pivotable between a closed position, in which said upper bight of said hook is positioned near said guide pin, and an open position, in which said lower bight of said hook is positioned near said shaft of said guide pin; and
   in which said hook can be disassembled from said guide pin by angling said bed cover and thereby said hook to a position in which said guide pin is adjacent said opening in said hook and moving said bed cover and thereby said hook away from said guide pin through said opening so as to release said hook from said guide pin, thereby having removed said cover from said bed flange.

16. A cover and hinge assembly for a truck comprising:
   a bed oriented substantially horizontally;

a bed flange fixedly mounted to said bed and at least partially circumscribing said bed;

a bed cover hingedly coupled to said bed flange and movable between a closed position, in which said cover overlies said bed, and at least one open position, in which said cover is pivoted at an angle relative to said bed, the bed cover having a forward end and a rearward end said bed cover including:

a substantially rectangular, substantially flat top sheet;

a foam core attached underneath said top sheet;

a fiberglass protective sheet mounted beneath said foam core;

a frame extending around the periphery of said sheet, said frame having two opposite longitudinal frame side pieces and two transverse frame side pieces, each frame piece having a short leg spaced inwardly from a side edge of said top sheet and a long leg extending from said short leg to the adjacent sheet side edge, said short legs having tracks;

four right angle corner brackets for uniting said frame pieces, each corner bracket having two perpendicular sides, one side of each corner bracket being attached to a longitudinal frame piece and the other side being attached to a transverse frame piece; and a gasket mounted underneath said long leg for sealing said cover and said bed flange when said cover is in the closed position;

a hinge assembly for mounting said bed cover to said bed flange, for allowing said bed cover to pivot about the forward end of said bed cover, and for allowing removal of said bed cover from said bed flange, said hinge assembly comprising:

a hinge element having a substantially plate-like rectangular mounting portion and a hook portion, said mounting portion having two U-shaped slots for mounting said hinge element to said bed cover, said hook portion being unitary with said mounting portion and extending outwardly therefrom along said length of said mounting portion, said hook portion having an inclined c-shaped hook, said hook having a downwardly opening upper bight, a leg extending downwardly from said upper bight and an upwardly facing lower bight substantially opposing said upper bight, said upper bight, leg, and lower bight defining a guide slot, said bights having ends opposite said leg spaced apart to define an opening to said bights;

a channel for mounting said hinge element to said cover, said channel fitting within said track on said short leg of one of said frame pieces and having inner surfaces;

two hexagonal nuts fitting within said channel such that said nuts abut the inner surfaces of said channel, thereby preventing rotation of said nuts, each nut being located adjacent one of said U-shaped slots in said mounting portion; and two bolts for threading through said U-shaped slots in said mounting portion of said hinge element and into said nuts in said channel for securing said hinge element to said channel, whereby said nuts are captured within said channel and said sides of said channel prevent said nuts from rotating; and a clamp mounting assembly having a large angle bar and a small angle bar having an edge, said large angle bar having a short leg and a long leg, said short leg of said large angle bar having an interior surface with a longitudinal groove for receiving said edge of said small angle bar, said assembled small and large angle bars forming a hollow square therebetween, said small angle bar having first and second legs, said bars being assembled so that said second leg extends substantially horizontally, whereby said second leg has a top and bottom surface, said second leg having a longitudinal groove on said top surface, each of said small and large angle bars having two thru-holes and, one thru-hole on said small angle bar aligning with one thru-hole on said large angle bar when said small and large angle bars are assembled so as to create a thru-hole set;

a bolt extending through each thru-hole set;

a nut screwed onto each bolt and seated within said longitudinal groove in said small angle bar, such that said groove prevents said nut from rotating, said assembled small angle bar being pivotable relative to said large angle bar so that said bed flange can be fitted into said hollow square by tightening said bolts between said small and large angle bars and clamped therebetween, whereby said assembled small and large angle bars act as a clamp; and a guide pin attached to said long leg of said large angle bar, said guide pin having an enlarged diameter portion and an axially-aligned reduced diameter portion with an outer end, said outer end of said reduced diameter portion having a head thereon, said guide pin sized to fit within said guide slot on said hinge element, said hook being pivotable about said forward end of said cover between the closed position, in which said upper bight of said hook is positioned near said guide pin, and the open position, in which said lower bight of said hook is positioned near said guide pin, and said cover being removable from said bed by pivoting said hook into a removal position, in which said guide pin is adjacent said opening in said hook, and moving said hook away from said guide pin through said opening so as to detach said hook from said guide pin, thereby detaching said cover from said bed.

\* \* \* \* \*

UNITED STATES PATENT AND TRADEMARK OFFICE
CERTIFICATE OF CORRECTION

PATENT NO. : 5,632,522
DATED : May 27, 1997
INVENTOR(S) : Gaitan et al.

It is certified that error appears in the above-identified patent and that said Letters Patent is hereby corrected as shown below:

Column 5, line 26: Please correct "rights" to read "bights".

Column 5, line 46: Please correct "18!" to read "18'".

Column 5, line 49: Please correct "upper right" to read "upper bight".

Column 5, line 58: Please correct "lower right" to read "lower bight".

Signed and Sealed this

Thirteenth Day of January, 1998

Attest:

BRUCE LEHMAN

Attesting Officer

Commissioner of Patents and Trademarks